United States Patent [19]
Barrett et al.

[11] Patent Number: 5,880,727
[45] Date of Patent: Mar. 9, 1999

[54] REPROGRAPHIC SYSTEM FOR ARRANGING PRESETS LOCATIONS IN A MULTI-LEVEL USER INTERFACE

[75] Inventors: Michael W. Barrett, Fairport; Andrew T. Martin, Webster; William C. Emerson, Rochester; Christie A. May, Macedon, all of N.Y.

[73] Assignee: Xerox Corporation, Stamford, Conn.

[21] Appl. No.: 838,106

[22] Filed: Apr. 15, 1997

[51] Int. Cl.[6] ........................................ G06F 3/00
[52] U.S. Cl. ............................. 345/357; 399/81
[58] Field of Search ............... 399/81; 345/965, 345/356, 357, 352, 353

[56] References Cited

U.S. PATENT DOCUMENTS

| | | | |
|---|---|---|---|
| 5,463,448 | 10/1995 | Wilson et al. | 399/81 |
| 5,495,581 | 2/1996 | Tsai | 345/357 X |
| 5,585,891 | 12/1996 | Altrieth et al. | 399/81 |
| 5,614,993 | 3/1997 | Smith et al. | 399/81 |
| 5,727,129 | 3/1998 | Barrett | 345/357 X |
| 5,760,771 | 6/1998 | Blonder et al. | 345/356 X |

*Primary Examiner*—A. Katbab
*Attorney, Agent, or Firm*—Michael J. Nickerson

[57] ABSTRACT

A method and system enables an assignment of a feature value from a set of preset feature values for a copy operation to be performed on a reprographic system The system displays a first screen on a user interface associated with the reprographic system, the first screen displaying a plurality of activatable areas corresponding to a subset of the set of preset feature values and an activatable area corresponding to a second screen associated with the set of preset reduction enlargement values. The system further determines if the activatable area corresponding to the second screen is engaged and displays the second screen on the user interface associated with the reprographic system the activatable area corresponding to the second screen is engaged, the second screen displaying a plurality of activatable areas such that each preset feature value within the set of preset feature values has an activatable area associated therewith.

20 Claims, 6 Drawing Sheets

REPROGRAPHIC SYSTEM FOR ARRANGING PRESETS LOCATIONS IN A MULTI-LEVEL USER INTERFACE

FIELD OF THE PRESENT INVENTION

The present invention is directed to a user interface for a reprographic system. More specifically, the present invention is directed to a user interface which enables the user to select a subset of a set of preset values to be associated with a main copying screen while having the full set of preset values being associated with a particuliar preset setting screen.

BACKGROUND OF THE PRESENT INVENTION

A conventional reprographic system is the office copier. Traditionally, the copier, in the office equipment context, refers to a light lens xerographic copier in which paper originals are in fact photographed. The images are focused on an area of a photoreceptor, which is subsequently developed with toner. The developed image on the photoreceptor is then transferred to a copy sheet which in turn is used to create a permanent copy of the original.

In recent years, however, there has been made available what is known as digital copiers. In the most basic functions, a digital copier performs the same functions as a light lens copier, except that the original image to be copied is not directly focused on a photoreceptor. Instead, with a digital copier, the original image is scanned by a device generally known as a raster input scanner (RIS) which is typically in the form of the linear array of small photosensors.

The original image is focused on the photosensors in the RIS. The photosensors convert the various light and dark areas of the original image to a set of digital signals. These digital signals are temporarily retained in a memory and then eventually used to operate a digital printing apparatus when it is desired to print copies of the original. The digital signals may also be sent directly to the printing device without being stored in a memory.

The digital printing apparatus can be any known type of printing system responsive to digital data, such as a modulating scanning laser which discharges image wide portions of a photoreceptor, or an ink jet printhead.

Moreover, with the advent of the digitalization of the office copier, there has also been made available digital multi-function machines. The digital multi-function machine is a single machine which provides a user with more than one function. An example of a typical multi-function machine would include a digital facsimile function, a digital printing function, and a digital copy function.

More specifically, a user can utilize this digital multi-function machine to send a facsimile of an original document to a remote receiving device, to scan in an original image and print copies thereof, and/or to print documents from either a network source, locally connected source, or from a portable memory device which has been inserted into the multi-function machine.

Figure 2:
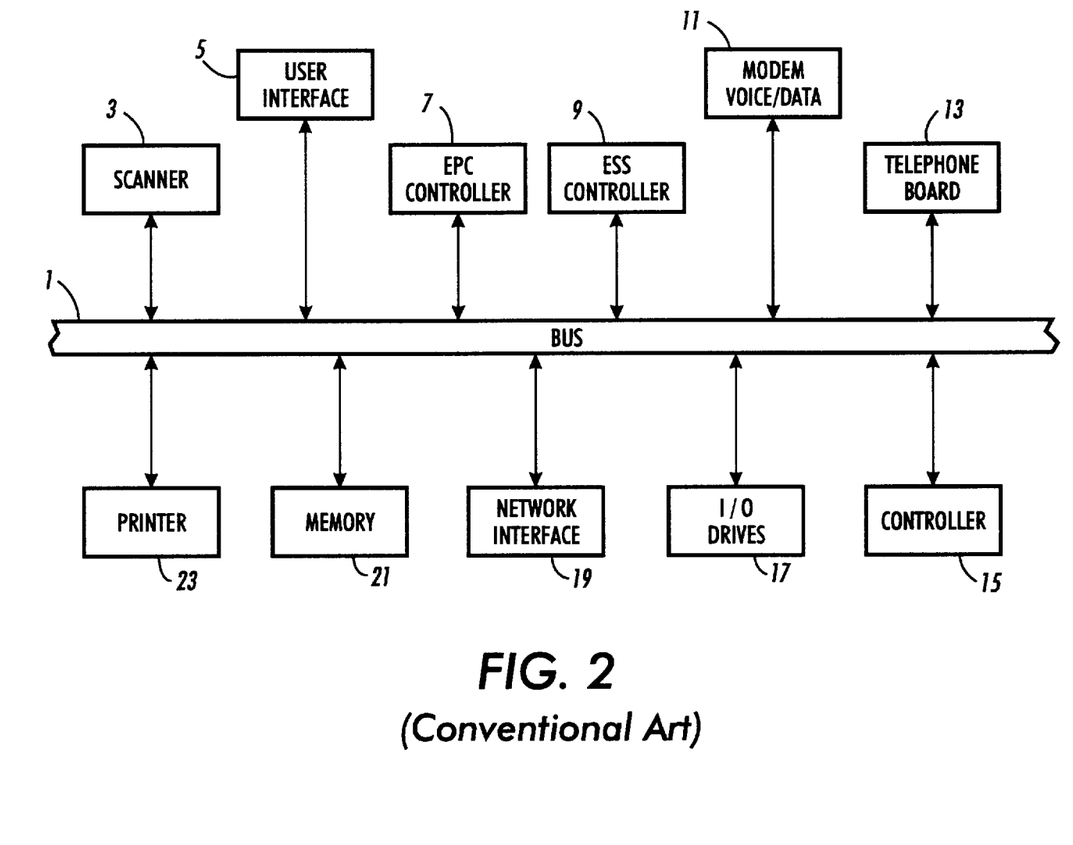
FIG. 2 is a block diagram illustrating the architecture of a digital reprographic machine.

An example of the basic architecture of a digital multi-function machine is illustrated in FIG. 2. As illustrated in FIG. 2, the architecture of the digital multi-function machine includes a scanner 3 which converts an original image into a set of digital signals that can be either stored or reproduced. The scanner 3 is connected to a central bus system 1 which may be either a single bus or a plurality of buses which provide interconnections and intercommunications between the various modules and devices on a multi-function digital machine.

The digital multi-function machine, as illustrated in FIG. 2, further includes a digital printing device 23 which converts digital signals representing an image into a hardcopy of that image on a recording medium whether the recording medium be paper, transparency, or other type of markable medium. The digital multi-function machine also includes a memory 21 for storing a variety of types of digital information such as machine fault information, machine history information, digital images to be processed at a later time, instruction sets for the machine, job instruction sets, etc.

In addition to the memory 21, a typical digital multi-function machine includes an electronic pre-collation memory section 7 which may store the digital representation of the image being presently rendered by the digital printing device 23. In the electronic pre-collation memory 7, the digital image is already laid out in its page structure so that it can be readily rendered by the digital printing device 23.

The digital multi-function machine as illustrated in FIG. 2, further includes a user interface 5 which allows the user to select the various functions of the multi-function machine, program various job attributes for the particularly selected function, provide other input to the multi-function machine as well as display informational data from the digital multi-function machine.

If the digital multi-function machine is connected to a network, the digital multi-function machine would include a network interface 19 and an electronic subsystem (ESS) controller 9 which would control the interrelationship between the various modules or devices on the digital multi-function machine and the network.

To enable a facsimile function, the digital multi-function machine would include, typically, a voice/data modem 11 and a telephone circuit board 13. Moreover, the digital multi-function machine may include input/output drives 17 such as a floppy disc drive, a CD ROM drive, a tape drive, or other type of drive which can accept a portable memory device.

In some digital multi-function machines, the machine also includes a finisher 29 which can perform certain operations upon the printed output from the printing device 23. Lastly, the digital multi-function machine includes a controller 15 which controls all the functions within the multi-function device so as to coordinate all the interactions between the various modules and devices.

Figure 1:
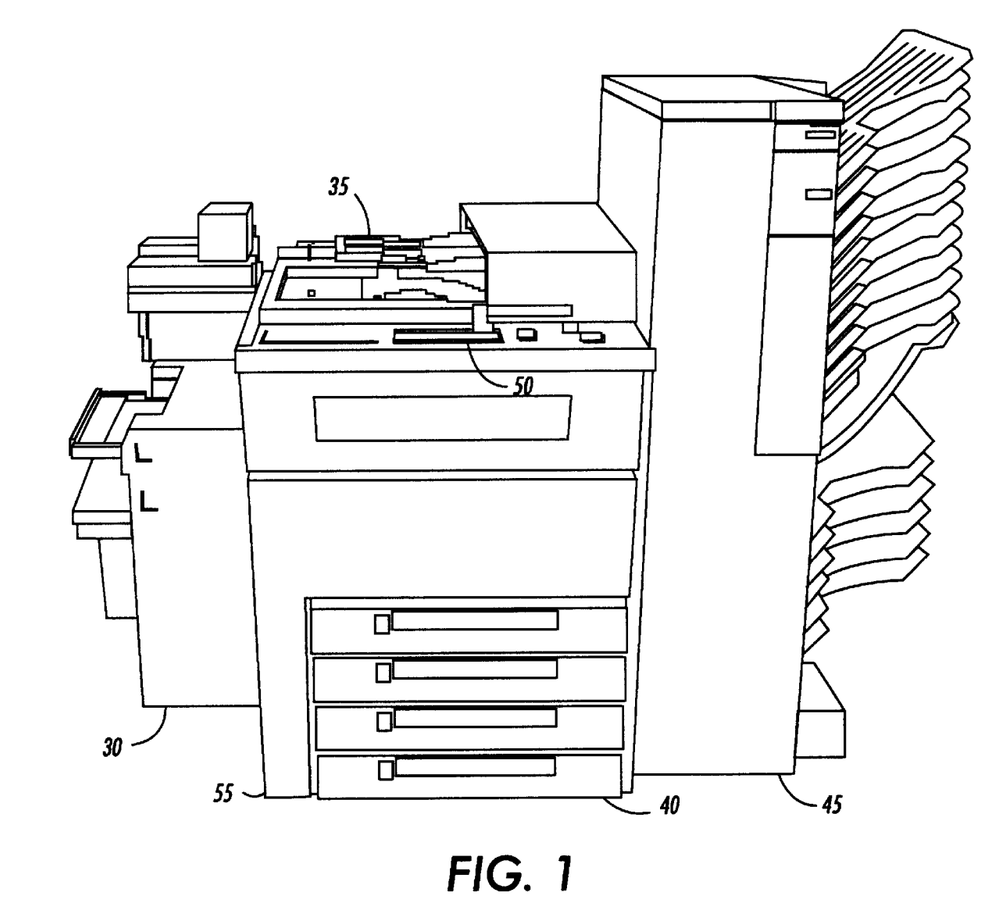
FIG. 1 is a graphic representation of a digital reprographic machine.

FIG. 1 illustrates an overall construction of a digital multi-function machine. The digital multi-function machine, as illustrated in FIG. 1, includes a scanning station 35, a printing station 55, and a user interface 50. The digital multi-function machine may also include a finisher device 45 which may be a sorter, tower mailbox, stapler, etc. The printing station 55 may include a plurality of paper trays 40 that store the paper used in the printing process. Lastly, the digital multi-function machine may include a high capacity feeder 30 which is capable of holding large amounts of paper stock to be used by the machine.

In a typical scanning function, the operator would utilize the scanning station 30 to scan in the images from the original documents. This scanning station 30 may be a platen type scanner or may include a constant velocity transport system which moves the original documents across a stationary scanning device. Moreover, the scanning station 30 may also include a document handling system which is capable of placing the original documents, automatically, on the glass platen for scanning.

With respect to the printing functions, the printing station 55 would retrieve the proper paper from one of the multiple paper trays or the high capacity feeder, render the desired image on the retrieved paper, and output the printed image to the finishing device 45 for further operations.

The user interface 50 allows the user to control the various functions of the digital multi-function machine by presenting various types of screens to the user which provides the user an opportunity to program certain job characteristics or function characteristics.

As with the migration of traditional light lens copiers to digital machines, the user-programmable features on a reprographic system have improved and increased. More specifically, the early reprographic systems included only a minimal number of user-programmable features, such as reduction, lighter/darker, and number of copies. As the reprographic machines evolved with technology, the user-programmable features became numerous. This increase in the population in the number of user-programmable features causes the user interfaces of the reprographic machine to increase in size, thereby creating new problems when trying to design a compact machine.

With the advent of reprographic systems having more and more features included for the user to program, different user interfaces have been developed in order to allow the user to program these various features. One such user interface is an interactive electronic display user interface which has multiple levels or multiple screens. The user of such an interface user can navigate through various screens to select the desired user-programmable features or attributes. More specifically, the user may encounter a main copying screen and navigational buttons to get to other screens or layered screens so as to program different features or attributes associated with those navigational buttons.

For example, a main copying screen may have a navigational button associated with the feature of reduction/enlargement. By activating this navigational button, the user interface would display a screen which has a plurality of reduction/enlargement activatable buttons as well as other programmable areas which allow the user to program a variety of reduction/enlargement values.

Although the utilization of such a multi-level or multi-screen system allows the user to program a multitude of features for the copying machine while maintaining a compact user interface, the utilization of multi-screens can also cause problems. For example, a typical scheme requires a user to navigate through various levels of the screens to program commonly used features or attributes into the reprographic system. Therefore, it is desirable to have a user interface which utilizes the multiple screens and multiple layers of an interactive electronic display user interface, but which has a main copying screen from which a user can readily program a few desired commonly used features without requiring a user to navigate through a plurality of screens.

SUMMARY OF THE PRESENT INVENTION

One aspect of the present invention is a method for enabling an assignment of a preset feature value from a set of preset feature values for a copy operation to be performed on a reprographic system. The method displays a first screen on a user interface associated with the reprographic system, the first screen displaying a plurality of activatable areas corresponding to a subset of the set of preset feature values and an activatable area corresponding to a second screen associated with the set of preset feature values; determines if the activatable area corresponding to the second screen is engaged; and displays the second screen on the user interface associated with the reprographic system when the activatable area corresponding to the second screen is engaged, the second screen displaying a plurality of activatable areas such that each preset feature value within the set of preset feature values has an activatable area associated therewith.

Another aspect of the present invention is a reprographic system. The system includes a marking system; a scanning system; a user interface; and a controller. The user interface displays a first screen, the first screen having a plurality of activatable areas corresponding to a subset of a set of preset feature values and an activatable area corresponding to a second screen associated with preset feature values. The controller determines if the activatable area corresponding to the second screen is engaged. The user interface displays the second screen in response to engagement of the activatable area corresponding to the second screen, the second screen displaying a plurality of activatable areas such that each preset feature value within the set of preset feature values has an activatable area associated therewith.

A third aspect of the present invention is a digital scanning system. The digital scanning system includes a scanning system; a user interface; and a controller. The user interface displays a first screen, the first screen having a plurality of activatable areas corresponding to a subset of a set of preset feature values and an activatable area corresponding to a second screen associated with preset feature values. The controller determines if the activatable area corresponding to the second screen is engaged. The user interface displays the second screen in response to engagement of the activatable area corresponding to the second screen, the second screen displaying a plurality of activatable areas such that each preset feature value within the set of preset feature values has an activatable area associated therewith.

Further objects and advantages of the present invention will become apparent from the following description of the various features of the present invention.

BRIEF DESCRIPTION OF THE DRAWINGS

The following is a brief description of the drawings used to describe the present invention, and thus, these drawings are being presented for illustrative purposes only and thus should not be limitative of the scope of the present invention, wherein.

DETAILED DESCRIPTION OF THE PRESENT INVENTION

The following is a detailed description of the present invention. In this description, the drawings have been utilized to illustrate the concepts of the present invention. In this description as well as in the drawings, like reference numerals indicate the same items or equivalent items.

As noted above, the present invention is directed to a user interface which has a multitude of screens wherein one of the screens is a main scree. The main screen has a plurality of activatable areas corresponding to a subset of a set of preset feature values and an activatable area corresponding to a second screen associated with preset feature values. A controller within the reprographic machine determines if the activatable area corresponding to the second screen is engaged. The user interface displays the second screen in response to engagement of the activatable area corresponding to the second screen, the second screen displaying a plurality of activatable areas such that each preset feature value within the set of preset feature values has an activatable area associated therewith.

To provide an enhanced description of the concepts of the present invention, the present invention will be described below with respect to the programmable feature, reduction/enlargement.

Figure 3:
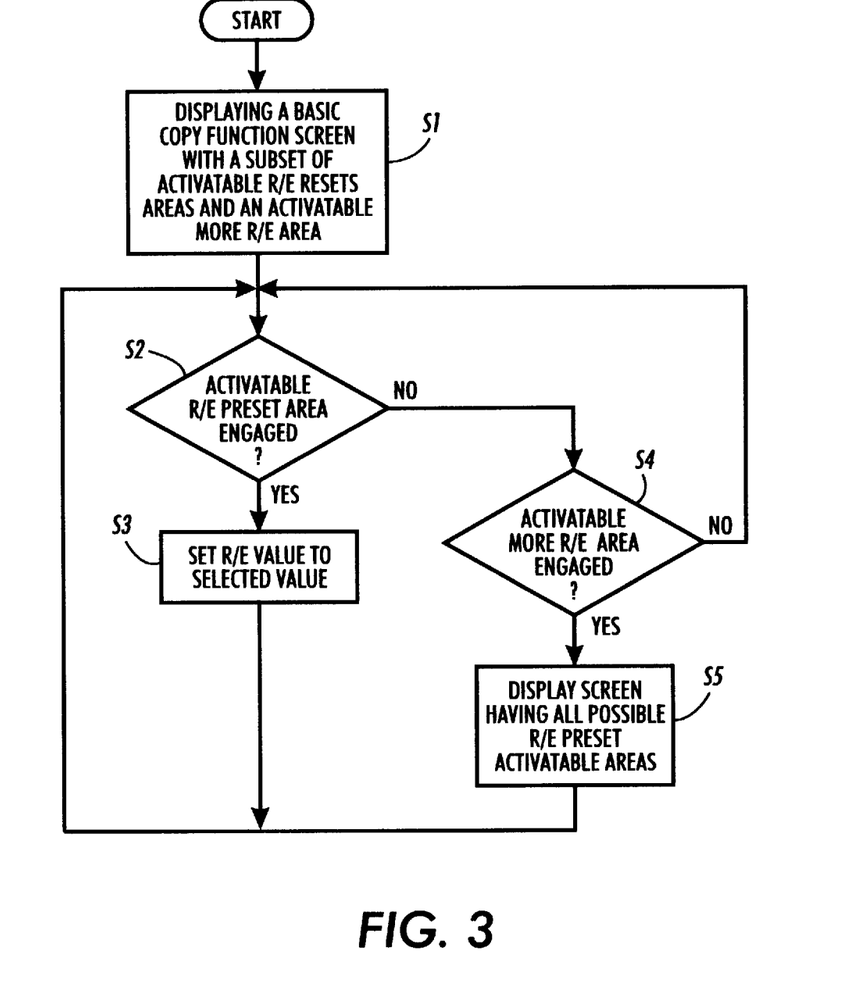
FIG. 3 is a flowchart illustrating a method of programming reduction/enlargement preset values according to the present invention.

FIG. 3 illustrates a flowchart demonstrating the concepts of the present invention for programming reduction/enlargement preset values. As illustrated in FIG. 3, at step S1, the present invention displays a basic copy function screen with a subset of activatable reduction/enlargement preset areas and an activatable more or other reduction/enlargement area. In the preferred embodiment of the present invention, the user interface is a touch-sensitive video display device. An example of such a basic copying function screen is illustrated in FIG. 4.

Figure 4:
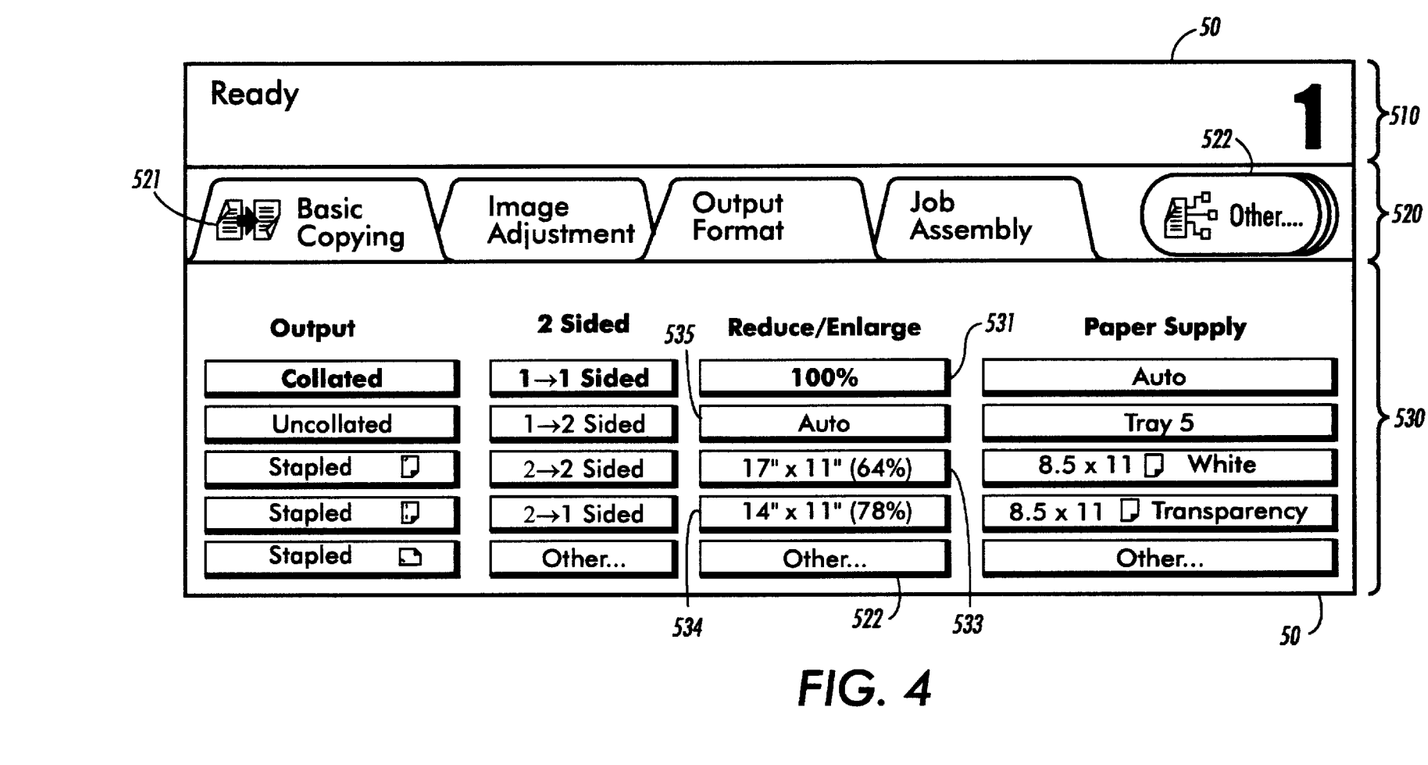
FIG. 4 illustrates a user interface screen layout showing a main copying screen according to the concepts of the present invention.

As illustrated in FIG. 4, the basic copy function screen 50 includes a message area 510, a navigational area 520, and a programmable area 530. In the message area 510, the digital copier will display various messages for the user informing the user of either the status of the machine or assists the user in programming a particular job. In the navigational area 520, the user may select any of the activatable tabs 521 in order to bring the features associated with that tab forward onto the screen and allowing the present features to fall behind the activated or engaged tab.

Moreover, the navigational area 520 includes navigational buttons 522 which allow the user to navigate to other various screens for carrying out other functions with respect to the reprographic system such as maintenance functions, key operator programming functions, supervisory functions, or diagnostic functions, etc. Lastly, the programmable area 530 of screen 50 includes a plurality of activatable areas wherein each activatable area is associated with a certain value, function, or linked screen.

Figure 5:
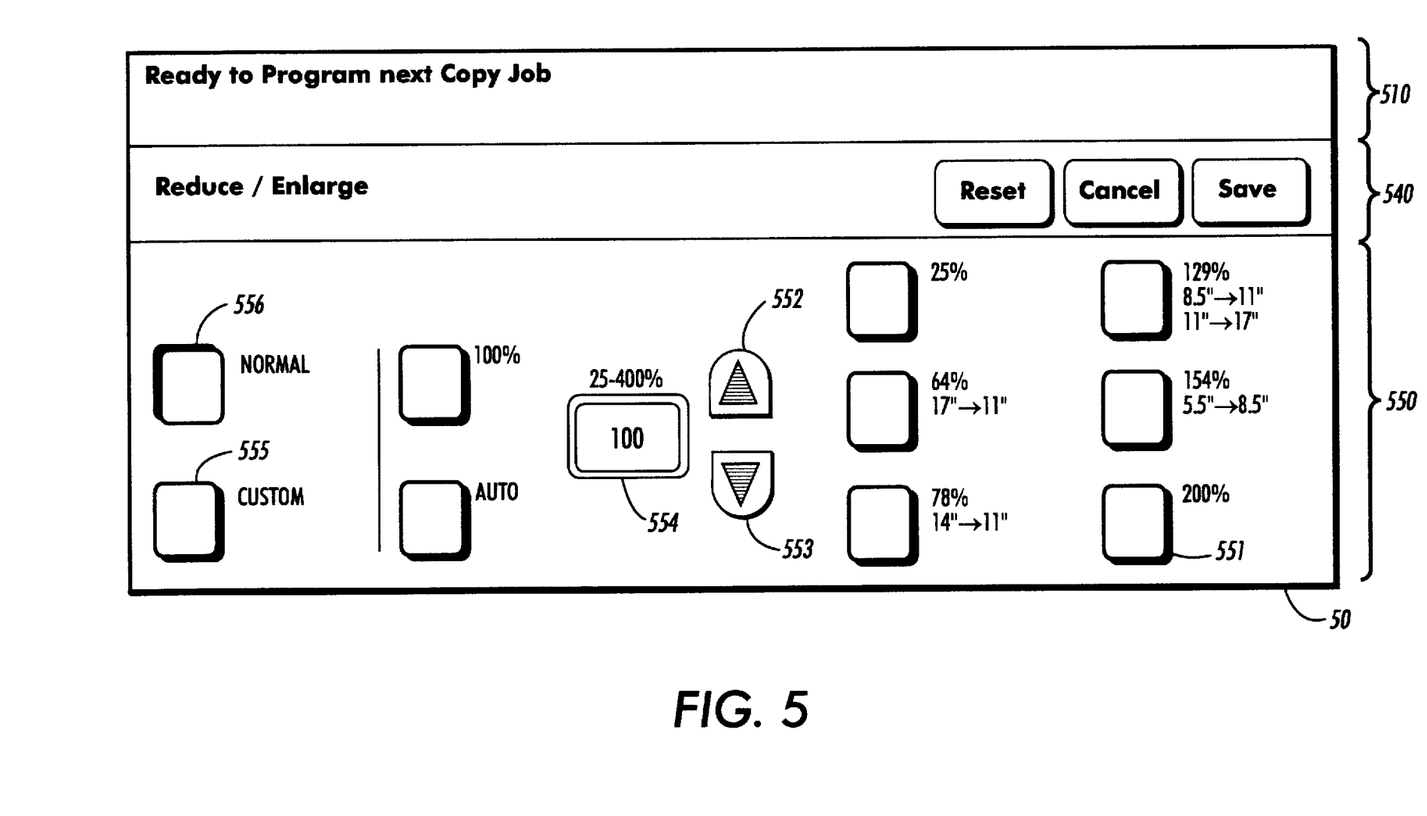
FIG. 5 is a graphical representation of a user interface screen used for programming normal reduction/enlargement values.

For example, as illustrated in FIG. 4, activatable area 531 is associated with the preset reduction/enlargement value of 100%. On the other hand, activatable area 532 of FIG. 4 is associated with a linked screen, more specifically, the screen as illustrated in FIG. 5. Thus, upon engagement or activation of the activatable area 532, the present invention will cause the screen as illustrated in FIG. 5 to replace the screen illustrated in FIG. 4 on the user interface.

Other activatable areas on the basic copy function screen 50 of FIG. 4 include reduction/enlargement preset activatable areas 533 and 534 which correspond to the preset reduction value 64% and 78%, respectively. Another activatable area with respect to reduction/enlargement on the basic copy function screen 50 is the activatable area 535 which corresponds to an auto-function in that when it is selected or engaged, the reprographic system will automatically size the scanned in image to fit properly upon the output recording medium.

After displaying the basic copy function screen at step S1, FIG. 3 illustrates that the present invention determines whether an activatable reduction/enlargement preset area has been engaged at step S2. If an activatable reduction/enlargement preset area is engaged at step S2, namely the activatable areas 531, 532, or 533, step S3 sets the reduction/enlargement value associated with the engaged activatable reduction/enlargement preset area as the reduction/enlargement value to be utilized by the reprographic system On the other hand, if step S4 determines that the activatable more or other reduction/enlargement area (activatable area 532 of FIG. 4) is engaged, step S5 displays a new screen having all the possible reduction/enlargement preset activatable areas displayed thereon, namely FIG. 5.

As illustrated in FIG. 5, a display screen 50 includes a message area 510, a user control area 540, and programmable area 550. The user control area 540 allows the user to either cancel the selection of this programming screen, reset the programming within this programming screen, or save the programming associated with this programming screen so as to be utilized by the reprographic system when performing the job being programmed.

The programmable area 550 of the display screen 50 includes a plurality of activatable reduction/enlargement preset areas 551. Moreover, the programmable area 550 includes a display area 554 which displays the current reduction/enlargement setting. The current reduction/enlargement setting can be either increased or decreased by activatable areas 552 and 553, respectively. Lastly, the programmable area 550 includes activatable areas 556 and 555 wherein activatable area 556 allows the user to program in normal reduction/enlargement values; i.e., the values illustrated in FIG. 5; while activatable area 555 allows the user to program anamorphic reduction/enlargement values through another screen (FIG. 6).

Figure 6:
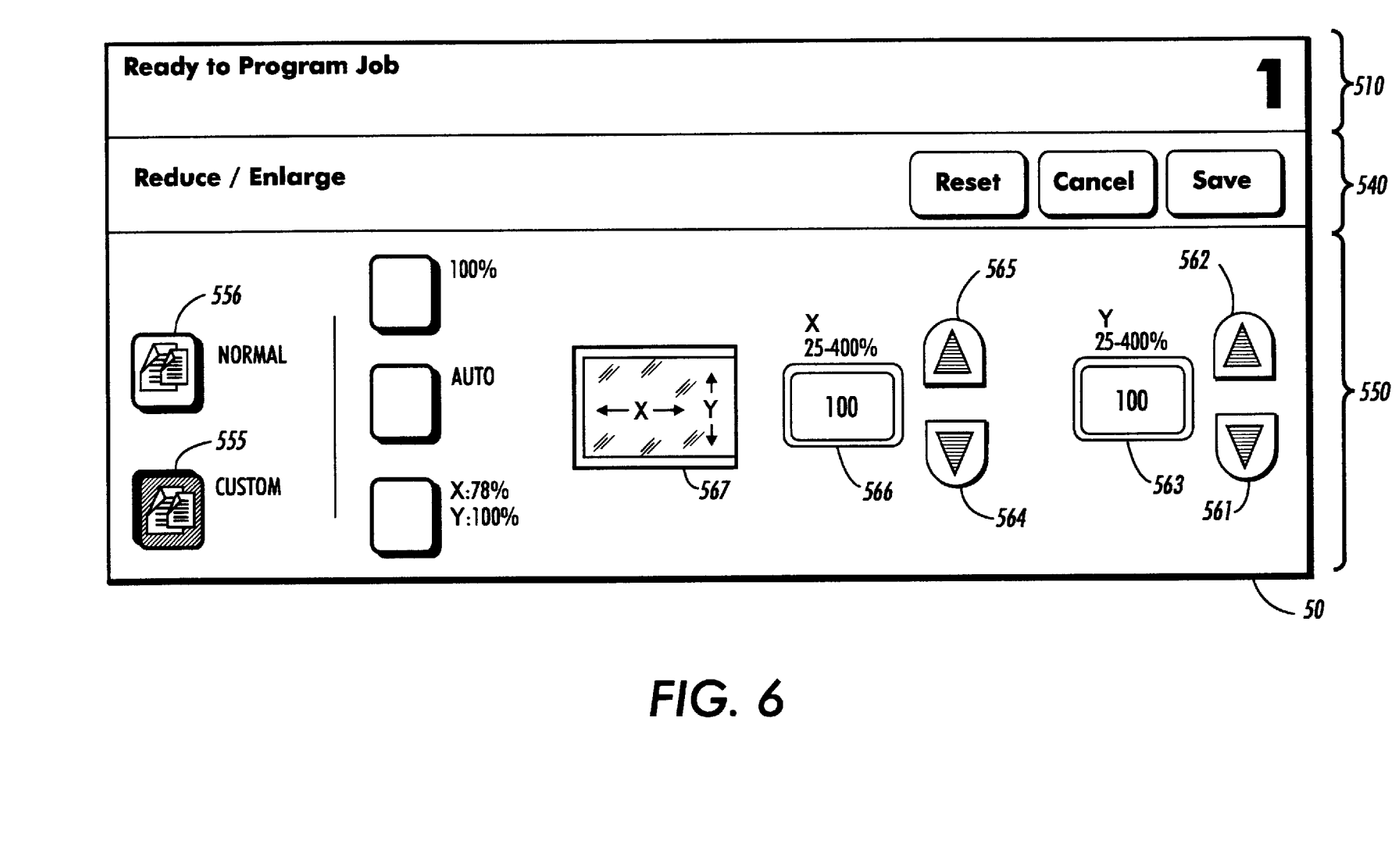
FIG. 6 is a graphical representation of a user interface screen used for programming anamorphic reduction/enlargement values.

If the user engages activatable area 555, the present invention causes the screen 50 illustrated in FIG. 6 to replace the screen illustrated in FIG. 5 by the user interface.

FIG. 6 illustrates a screen 50 which includes a message area 510, a user control area 540, and a programmable area 560. The programmable area 560 allows a user to program the reduction/enlargement values of the two dimensions independently of each other through activatable areas 561, 562, 564, and 565. Display areas 563 and 566 indicate to the user the reduction/enlargement value for the two independent dimensions. Lastly, the programmable area 560 includes a graphical display area 567 which conveys to the user, graphically, the reduction/enlargement relationship between the two dimensions.

In a further embodiment of the present invention, the user can select which subset of the reduction/enlargement preset values are displayed on the basic copying function screen as illustrated in FIG. 4. More specifically, in a preferred embodiment of the present invention, the user can select any of the various reduction/enlargement preset values illustrated in FIG. 5 to make up the subset of reduction/enlargement preset values which are activatable from the main copying function screen as illustrated in FIG. 4.

For example, the user may choose to have the reduction/enlargement values 25% and 200% associated with the activatable areas 533 and 534 of FIG. 4, respectively, instead of the reduction/enlargement preset values of 64% and 78%, respectively. Thus, the user can configure the user interface such that the basic copying screen displays a subset of the reduction/enlargement preset values which are common for that user so that the user need not navigate through a plurality of screens in order to program a commonly used reduction/enlargement value.

Although the present invention has been described in detail above, various modifications can be made without departing from the spirit of the invention. For example, the above description describes the present invention as a touch-sensitive video screen as the user interface. As an alternative, the user interface can be a video screen which interacts with a point/click device such as a mouse or a video screen which is light sensitive or magnetically sensitive so as to response to a light pen or magnetic pen.

Moreover, the present invention, as noted above, is not limited to reduction/enlargement preset values. The concepts of the present invention can be expanded to any programmable feature; such as paper selection, finishing features, image processing features, etc.; so as to allow the user to select the commonly used programmable feature to be displayed on the main copying screen. This enables the user to select these commonly used features without navigating through plurality of screens or levels.

In summary, the present invention provides a user interface configuration which enables a user to select a subset of a set of feature preset values from a main copying screen without requiring the user to navigate through a plurality of screens to set these commonly used feature values. Moreover, the user interface allows the user to navigate to a specific feature screen so as to be able to choose a feature value from the full set of preset values or to program in a particular feature value.

While the present invention has been described with reference to various embodiments as described above, it is not confined to the details set forth above, but is intended to cover such modifications or changes as may come within the scope to the attached claims.

What is claimed is:

1. A method for enabling an assignment of a feature value from a set of preset feature values for a copy operation to be performed on a reprographic system, comprising the steps of:
    (a) displaying a first screen on a user interface associated with the reprographic system, the first screen displaying a plurality of navigational activatable areas each corresponding to another screen associated with other functions and a plurality of feature activatable areas such that selected feature activatable areas correspond to a preset feature value, the feature activatable areas including a set of reduction/enlargement activatable areas each corresponding to a preset reduction/enlargement value and a navigational reduction/enlargement activatable area corresponding to a second screen associated with the reduction/enlargement function;
    (b) determining if the navigational reduction/enlargement activatable area corresponding to the second screen is engaged; and
    (c) displaying the second screen on the user interface associated with the reprographic system when said step (b) makes a positive determination, the second screen displaying a plurality of activatable areas such that selected activatable areas have associated therewith a displayed preset reduction/enlargement value.

2. The method as claimed in claim 1, further comprising the steps of:
    (d) determining if a feature activatable area has been engaged; and
    (e) setting a feature attribute of the copying operation associated with the feature activatable area determined to be engaged by said step (d).

3. The method as claimed in claim 1, wherein preset feature values displayed on the first screen are customizable such that a user can change the preset feature values being displayed on the first screen.

4. The method as claimed in claim 1, wherein the second screen displaying an activatable area corresponding to a third screen associated with custom programming of the reduction/enlargement function.

5. The method as claimed in claim 4, further comprising the steps of:
    (d) determining if the activatable area corresponding to the third screen is engaged; and
    (e) displaying the third screen on the user interface associated with the reprographic system when said step (d) makes a positive determination.

6. A reprographic system comprising:
    a marking system;
    a scanning system;
    a user interface; and
    a controller;
    said user interface displaying a first screen on a user interface associated with the reprographic system;
    said first screen displaying a plurality of navigational activatable areas each corresponding to another screen associated with other functions and a plurality of feature activatable areas such that selected feature activatable areas correspond to a preset feature value;
    said feature activatable areas including,
        a set of reduction/enlargement activatable areas each corresponding to a preset reduction/enlargement value, and
        a navigational reduction/enlargement activatable area corresponding to a second screen associated with the reduction/enlargement function;
    said controller determining if said navigational reduction/enlargement activatable area corresponding to said second screen is engaged;
    said user interface displaying said second screen in response to engagement of said navigational reduction/enlargement activatable area corresponding to said second screen;
    said second screen displaying a plurality of activatable areas such that selected activatable areas have associated therewith a displayed preset reduction/enlargement value.

7. The reprographic system as claimed in claim 6, wherein said controller determines if a feature activatable area has been engaged; and
    said controller sets a feature attribute of a copying operation associated with the engaged activatable area.

8. The reprographic system as claimed in claim 6, wherein preset feature values displayed on the first screen are customizable such that a user can change the preset feature values being displayed on the first screen.

9. The reprographic system as claimed in claim 6, wherein said second screen displaying an activatable area corresponding to a third screen associated with custom programming of the reduction/enlargement function.

10. The reprographic system as claimed in claim 9, wherein said controller determines if said activatable area corresponding to said third screen is engaged; and
    said user interface displays said third screen in response to engagement of said activatable area corresponding to said third screen.

11. The reprographic system as claimed in claim 6, wherein said user interface is a touch sensitive video screen.

12. The reprographic system as claimed in claim 6, wherein said user interface includes a video display screen and a point/clicking device.

13. The reprographic system as claimed in claim 6, wherein said user interface is a light sensitive video screen.

14. The reprographic system as claimed in claim 6, wherein said user interface is a magnetic sensitive video screen.

15. A digital scanning system, comprising:

a scanning system;

a user interface; and a controller;

said user interface displaying a first screen on a user interface associated with the reprographic system;

said first screen displaying a plurality of navigational activatable areas each corresponding to another screen associated with other functions and a plurality of feature activatable areas such that selected feature activatable areas correspond to a preset feature value;

said feature activatable areas including,
 a set of reduction/enlargement activatable areas each corresponding to a preset reduction/enlargement value, and
 a navigational reduction/enlargement activatable area corresponding to a second screen associated with the reduction/enlargement function;

said controller determining if said navigational reduction/enlargement activatable area corresponding to said second screen is engaged;

said user interface displaying said second screen in response to engagement of said navigational reduction/enlargement activatable area corresponding to said second screen;

said second screen displaying a plurality of activatable areas such that selected activatable areas have associated therewith a displayed preset reduction/enlargement value.

16. The scanning system as claimed in claim 15, wherein said controller determines if a feature activatable area has been engaged; and said controller sets a feature attribute of a copying operation associated with the engaged activatable area.

17. The scanning system as claimed in claim 15, wherein preset feature values displayed on the first screen are customizable such that a user can change the preset feature values being displayed on the first screen.

18. The scanning system as claimed in claim 15, wherein said second screen displaying an activatable area corresponding to a third screen associated with custom programming of the reduction/enlargement function.

19. The scanning system as claimed in claim 18, wherein said controller determines if said activatable area corresponding to said third screen is engaged; and said user interface displays said third screen in response to engagement of said activatable area corresponding to said third screen.

20. The scanning system as claimed in claim 15, wherein said user interface is a touch sensitive video screen.

* * * * *